G. HAMMOND.
GRIP SLIDE RETAINER.
APPLICATION FILED JULY 16, 1913.

1,133,281.

Patented Mar. 30, 1915.

WITNESSES:

INVENTOR.
Grant Hammond.
BY
Arthur Jenkins
ATTORNEY.

UNITED STATES PATENT OFFICE.

GRANT HAMMOND, OF HARTFORD, CONNECTICUT, ASSIGNOR OF ONE-THIRD TO ALVA C. WASHBURNE, OF PITTSFIELD, MASSACHUSETTS, AND ONE-THIRD TO FREDERICK G. CRANE, OF DALTON, MASSACHUSETTS.

GRIP-SLIDE RETAINER.

1,133,281.    Specification of Letters Patent.    Patented Mar. 30, 1915.

Original application filed October 25, 1912, Serial No. 727,694. Divided and this application filed July 16, 1913. Serial No. 779,271.

*To all whom it may concern:*

Be it known that I, GRANT HAMMOND, a citizen of the United States, and a resident of Hartford, in the county of Hartford and State of Connecticut, have invented a new and Improved Grip-Slide Retainer, of which the following is a specification.

My invention relates more especially to devices for retaining the grip slides of the handles of pistols removably in position, and an object of my invention, among others, is to provide a device of this class that shall be simple in construction and operation and effective for the purpose intended.

One form of device embodying my invention, and in the construction and use of which the objects herein set out, as well as others, may be attained, is illustrated in the accompanying drawings, in which—

Figure 1:
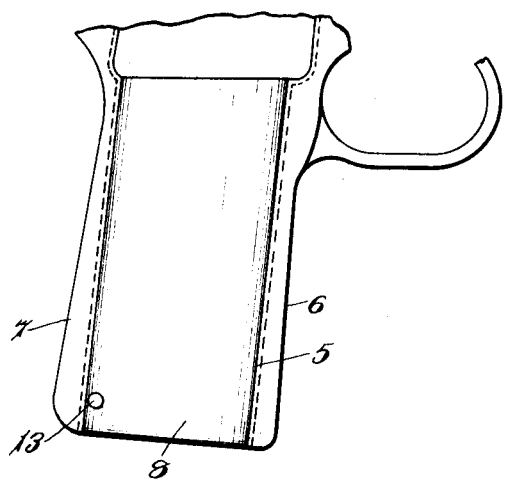
Figure 2:
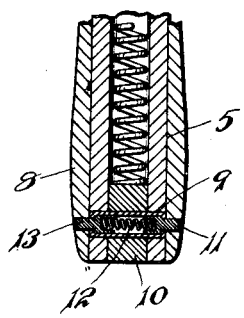
Figure 3:
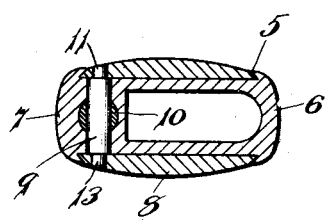

Figure 1 is a view in side elevation of the lower portion of the handle of a pistol embodying my invention. Fig. 2 is a view in lengthwise section through the same. Fig. 3 is a view in cross section through the handle.

In the accompanying drawings the numeral 5 denotes the handle as a whole including a front edge 6, and a back edge 7. These edges are undercut to form dove-tail shaped grooves extending lengthwise of the handle on opposite sides thereof, and grip slides or plates 8 are located in these grooves, being slid to place from the lower end of the handle. These plates may be formed of wood, rubber or other proper material, and they have beveled edges to fit within the dove-tail shaped grooves. Holes are formed through these grip plates immediately opposite the opening in a sleeve pin 9 when the grips are in place in the handle, this sleeve pin, in the construction herein shown, being used to hold a plug 10 closing a hole in the handle within which one of the actuating springs is located. Grip plate retaining pins 11 are located within the chamber in the sleeve pin, the ends of the retaining pins projecting into the grip plates to hold them in place. A spring 12 is located between the pins, pressing them normally outward, and the ends of the pins are slightly enlarged, forming a shoulder over which the ends of the sleeve pin are spun, forming a lip to retain the pins in place in said sleeve pin.

It will be noted that the pressure of the spring 12 forces the ends 13 of the retaining pins into the holes in the grip plates, and when it is desired to remove the grips, pressure upon the ends of the pins will move them inwardly to a sufficient degree to permit the grip plates to be removed, the retaining pins being always held in the sleeve pin 9 by the lips thereon. The sleeve pin may be employed, if desired, to hold other parts, as the plug 10, against which one of the actuating springs rests.

The invention forming the subject matter of this application was originally included in my co-pending application of S. No. 727,694, filed October 25th, 1912, from which the matter has been divided out to form the basis for this application.

While I have illustrated and described herein mechanism embodying my invention in the preferred form this may be departed from to a greater or lesser extent and yet be within the spirit and intent of the invention.

I claim—

1. A firearm including a frame having retaining grooves, grips slidable into said grooves, pins arranged to engage said grips to prevent them from sliding movement and a single spring resting against said pins to force them into engagement with said grips.

2. A firearm including a handle having retaining grooves on opposite sides thereof, a sleeve mounted in the handle, spring seated pins located in said sleeve and forced in opposite directions, grips slidable into said grooves and having openings to receive the ends of said pins, and means for holding the pins within said sleeve.

3. A firearm including a handle having retaining grooves on opposite sides thereof, a sleeve mounted in the handle, spring seated pins located in said sleeve and having enlarged ends over which the edges of the sleeve are spun to hold the pins in place, a spring thrusting against the inner ends of said pins, and grips slidable into said grooves and having openings to receive the ends of said pins.

4. A firearm including a handle, a member removably located in the handle, a sleeve pin extending through said member to hold it in place, said handle having retaining grooves located on opposite sides thereof, spring seated pins located in said sleeve, grips slidable into said grooves and having openings to receive the ends of said pins, and means for yieldingly holding the pins within said sleeves.

5. A firearm including a handle having retaining grooves on opposite sides thereof, a sleeve mounted in the handle, pins located in said sleeve, means for forcing the pins in opposite directions, and grips slidable into said grooves and having openings to receive the ends of said pins.

GRANT HAMMOND.

Witnesses:
ARTHUR B. JENKINS,
E. H. EATON.